United States Patent [19]
Harada et al.

[11] Patent Number: 5,080,507
[45] Date of Patent: Jan. 14, 1992

[54] OPTICAL WAVELENGTH CONVERTING METHOD

[75] Inventors: Akinori Harada; Yoji Okazaki; Koji Kamiyama, all of Kanagawa, Japan

[73] Assignee: Fuji Photo Film Co., Ltd., Kanagawa, Japan

[21] Appl. No.: 585,535

[22] Filed: Sep. 20, 1990

[30] Foreign Application Priority Data

Sep. 22, 1989 [JP] Japan .................... 1-246947
Jun. 13, 1990 [JP] Japan .................... 2-154476

[51] Int. Cl.$^5$ .................................... G02F 1/37
[52] U.S. Cl. ..................... 385/122; 385/123; 385/143; 359/328; 359/332
[58] Field of Search ................. 307/425–430; 350/96.12, 96.13, 96.14, 96.15, 96.29, 96.30, 96.34

[56] References Cited

U.S. PATENT DOCUMENTS

| | | | |
|---|---|---|---|
| 3,679,907 | 7/1972 | Bonner et al. ................. | 307/425 |
| 4,826,283 | 5/1989 | Chuangtian et al. .......... | 350/96.12 |
| 4,893,888 | 1/1990 | Okazaki et al. ................ | 350/96.12 |
| 4,909,595 | 3/1990 | Okazaki et al. ................ | 350/96.29 |
| 4,909,596 | 3/1990 | Okazaki et al. ................ | 350/96.29 |
| 4,981,613 | 1/1991 | Okazaki et al. ................ | 350/96.30 X |

Primary Examiner—John D. Lee
Attorney, Agent, or Firm—Sughrue, Mion, Zinn Macpeak & Seas

[57] ABSTRACT

A fundamental wave is caused to enter a Cerenkov-radiation type optical wavelength converter device which is formed of a single-crystal organic nonlinear optical material of an orthorhombic system of mm2 point group disposed in a cladding as a waveguide and a wavelength-converted wave such as a second harmonic whose wavelength within the range of 430 to 500 nm is extracted. The wavelength of the fundamental wave is selected so that the wavelength of the wavelength-converted wave becomes longer than the absorption edge of the organic nonlinear optical material by at least 30 nm. The fundamental wave is linearly polarized in the direction of the x-optic-axis or the y-optic-axis of the crystal of the organic nonlinear optical material and then caused to enter the optical wavelength converter device, and a wavelength-converted wave which is linearly polarized in the z-optic-axis of the crystal is extracted.

3 Claims, 4 Drawing Sheets

OPTICAL WAVELENGTH CONVERTING METHOD

BACKGROUND OF THE INVENTION

1. Field of the Invention

This invention relates to an optical wavelength converting method for converting a fundamental wave into a second harmonic or the like by the use of a Cerenkov-radiation type optical wavelength converter device, and more particularly to such a method in which a blue region wavelength-converted wave can be obtained at higher efficiency.

2. Description of the Prior Art

Many of conventional silver halide photosensitive materials which are used for a color printer or the like exhibit spectral sensitivity properties shown by curve a in FIG. 2 in the blue region. As can be understood from the curve a, many of silver halide photosensitive materials are remarkably sensitive to light having a wavelength near 480 nm and their spectral sensitivity peaks at about 470 nm. Recently, silver halide photosensitive materials which exhibit high sensitivity to light having a wavelength up to about 500 nm as shown by curve b in FIG. 2 and conform to a 488 nm blue laser beam emitted from an Ar-laser have been available.

When light having a wavelength shorter than 430 nm is used as a recording beam, there arise problems with respect to absorption in gelatin, limitation on spectral sensitizer, stability of color images and the like. Accordingly, when a color image is recorded on a silver halide photosensitive recording medium by scanning the recording medium with a blue laser beam, it is necessary to use a blue laser beam having a wavelength of 430 to 500 nm in order to obtain a clear and stable color image.

When recording information on an optical disk with a laser beam, the shorter the wavelength of the laser beam is, the smaller the beam spot can be and the denser recording becomes feasible. However, also in this case, a laser beam having a wavelength not shorter than 430 nm must be used at present due to limitation on coloring materials, absorption in the substrate of the disk, and the like.

Further, in the color printer system and the optical disk system, it is preferred that a laser beam having a wavelength of not shorter than 430 nm be used also in view of the transmittivity of the lens.

As described above, a laser beam having a wavelength of 430 to 500 nm provides substantial improvement in performances of various optical systems. However, a blue laser which is compact in size and can be directly modulated has not been put to practical use. Further it is said that a semiconductor laser which emits blue region laser beam will not be put to practical use for the time being.

Under these conditions, various attempts have been made to shorten the wavelength of a laser beam by the use of an optical wavelength converter device. For example, there has been disclosed in U.S. Pat. No. 4,909,595 a Cerenkov-radiation type optical wavelength converter device which is in the form of an optical fiber comprising a core of a single-crystal organic nonlinear optical material and a cladding which surrounds the core. As the organic nonlinear optical material, those of an orthorhombic system of mm2 point group can be used.

By means of a combination of such an optical wavelength converter device and a laser source, a blue laser beam can be obtained relatively easily. However, since the wavelength conversion efficiency of such a system is low, it has been difficult to obtain a blue laser beam having an intensity sufficient for the aforesaid applications.

SUMMARY OF THE INVENTION

In view of the foregoing observations and description, the primary object of the present invention is to provide an optical wavelength converting method which can convert a laser beam into a second harmonic or the like at an extremely high efficiency, thereby providing a high-intensity blue laser beam whose wavelength is within the range of 430 to 500 nm.

In accordance with the present invention, there is provided an optical wavelength converting method in which a fundamental wave is caused to enter a Cerenkov-radiation type optical wavelength converter device comprising a single-crystal organic nonlinear optical material of an orthorhombic system of mm2 point group disposed in a cladding as a waveguide and a wavelength-converted wave such as a second harmonic whose wavelength is within the range of 430 to 500 nm is extracted, characterized in that the wavelength of said fundamental wave is selected so that the wavelength of the wavelength-converted wave becomes longer than the absorption edge of the organic nonlinear optical material by at least 30 nm, and the fundamental wave is linearly polarized in the direction of the x-optic-axis or the y-optic-axis of the crystal of the organic nonlinear optical material and then caused to enter the optical wavelength converter device, and a wavelength-converted wave which is linearly polarized in the z-optic-axis of the crystal is extracted.

In the present invention, as the optical wavelength converter device may be employed those of a fiber-type, a three-dimensional optical waveguide type or a two-dimensional optical waveguide type.

The optical material of an orthorhombic system of mm2 point group has non-diagonal term components $d_{31}$, $d_{32}$, $d_{15}$ and $d_{24}$ in addition to a diagonal term component $d_{33}$, these components being nonlinear optical constants. In the nonlinear optical components, $d_{31}$, $d_{32}$ and $d_{33}$ are easy to use in the optical waveguide type optical wavelength converter device.

Our investigation has revealed that the wavelength conversion efficiency is remarkably improved when the non-diagonal term components $d_{31}$ and $d_{32}$ are used as compared with when the diagonal component $d_{33}$ is used. On the basis of this fact, in accordance with the present invention, the linear polarizing direction of the fundamental wave is set with respect to the x-, y- and z-optic-axes of the crystal of the organic nonlinear optical material so that the non-diagonal term components $d_{31}$ and $d_{32}$ among the nonlinear optical constants are used.

In the orthorhombic system materials, the optic axes conform to the crystal axes. Accordingly, when the crystal of the organic nonlinear optical material is oriented so that one of its crystal axes extends in the wave guiding direction (which can be realized very easily as disclosed in U.S. Pat. No. 4,909,595), two of the optic axes are included in a plane perpendicular to the wave guiding direction. Accordingly it is easy to set relation between the linear polarizing directions of the fundamental wave and the wavelength-converted wave and the optic axes as described above.

Our investigation has further revealed that when the linear polarizing direction of the fundamental wave is set as described above in order to obtain a wavelength-converted wave having a wavelength with the range of 430 to 500 nm, an inherent problem arises.

That is, many of the organic nonlinear optical materials for the waveguide have an absorption edge within the range of 400 to 550 nm, and accordingly, an organic nonlinear optical material whose absorption edge is near the wavelength of the wavelength-converted wave to be obtained (of course, the former being shorter than the latter) must be used in order to obtain a wavelength-converted wave having a wavelength within the range of 430 to 500 nm. Generally the absorption edge of the nonlinear optical material is defined as a lower limit of the wavelength above which the transmittivity for ethanol solution of the optical material ($4 \times 10^{-4}$ mol/l) is not lower than 90%.

Conventionally, it has been thought that problem of absorption of the wavelength-converted wave does not arise so long as the wavelength of the wavelength-converted wave is slightly longer than the absorption edge of the nonlinear optical material. However, it has found that when the linear polarizing direction of the fundamental wave is set as described above and the non-diagonal term components $d_{31}$ and $d_{32}$ are used, absorption of the wavelength-converted wave is too large and no wavelength-converted wave can emanate from the optical wavelength converter device unless the wavelength of the wavelength-converted wave is longer than the absorption edge by at least 30 nm. Accordingly, in accordance with the present invention, the wavelength of the fundamental wave is selected so that the wavelength of the wavelength-converted wave becomes longer than the absorption edge of the organic nonlinear optical material by at least 30 nm.

DESCRIPTION OF THE PREFERRED EMBODIMENTS

First Embodiment

Figure 1:
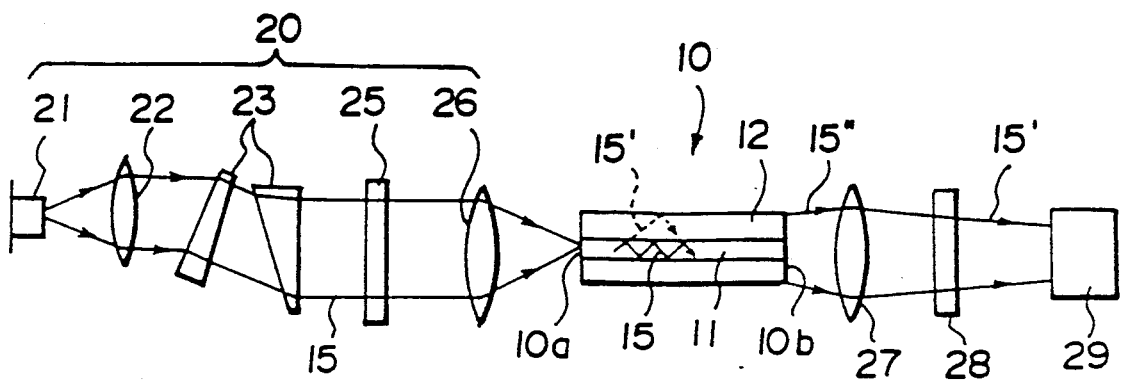
FIG. 1 is a schematic view showing an example of an optical wavelength conversion module for carrying out the method of the present invention.

In FIG. 1, an optical wavelength conversion module comprises an optical wavelength converter device 10 and a light source system 20 which applies a fundamental wave to the optical wavelength converter device 10.

The optical wavelength converter device 10 is in the form of an optical fiber which comprises a cladding 12 having a central hole and a core 11 filled in the central hole in the cladding 12. In this embodiment, the core 11 of the optical wavelength converter device 10 is formed of a single crystal of an organic nonlinear optical material represented by the following formula, i.e., 3,5-dimethyl-1-(4-nitrophenyl)pyrazole (will be referred to as "PRA", hereinbelow.) The cladding 12 is made of optical glass.

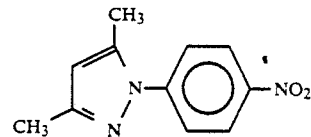

Figure 3:
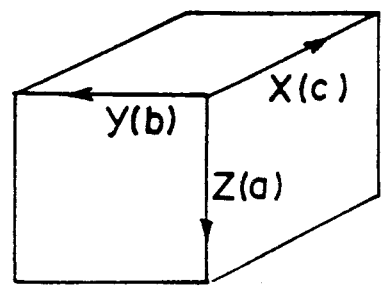
FIG. 3 is a schematic perspective view of a bulk crystal of PRA used in the optical wavelength converter device of the optical wavelength conversion module shown in FIG. 1.

The bulk-crystal structure of the PRA is shown in FIG. 3. The PRA crystal is of an orthorhombic system and its point group is mm2. Therefore the tensor of the nonlinear optical constants is as follows.

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

If it is assumed that optical axes X, Y and Z are determined with respect to crystal axes a, b and c as shown in FIG. 3, then $d_{31}$ is a nonlinear optical constant for extracting a Z-polarized second harmonic when light which is linearly polarized in the direction of X-axis (X-polarized light) is applied as the fundamental wave. $d_{32}$ is a nonlinear optical constant for extracting a Z-polarized second harmonic when light which is linearly polarized in the direction of Y-axis (Y-polarized light) is applied as the fundamental wave. $d_{33}$ is a nonlinear optical constant for extracting a Z-polarized second harmonic when light which is linearly polarized in the direction of Z-axis (Z-polarized light) is applied as the fundamental wave. $d_{24}$ is a nonlinear optical constant for extracting a Y-polarized second harmonic when Y- and Z-polarized fundamental waves are applied. $d_{15}$ is a nonlinear optical constant for extracting a X-polarized second harmonic when X- and Z-polarized fundamental waves are applied. The magnitudes of the respective nonlinear optical constants are given in the following table.

|          | ①   | ②        |
|----------|-----|----------|
| $d_{31}$ | 26  | —        |
| $d_{32}$ | 160 | 240 ± 140 |
| $d_{33}$ | 67  | 70 ± 10  |
| $d_{15}$ | 26  | —        |

-continued

| | (1) | (2) |
|---|---|---|
| $d_{24}$ | 160 | — |

The values in the column (1) are obtained by the X-ray crystal structure analysis and the values in the column (2) are measured by the Marker Fringe process. Both are values in the unit of [x $10^{-9}$ esu]. The absorption edge of PRA is 402 nm.

Figure 5:
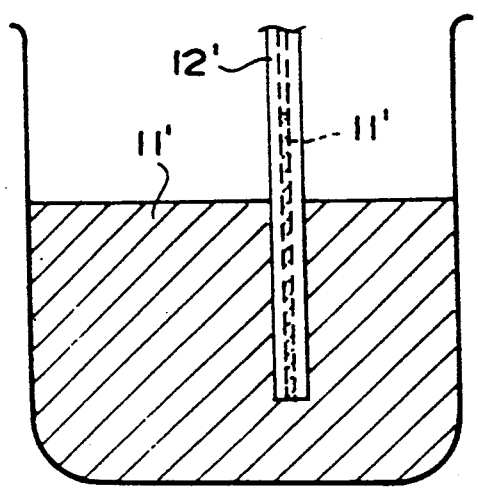
FIG. 5 is a schematic view for illustrating a process for manufacturing the optical wavelength converter device.

A process for manufacturing the optical wavelength converter device 10 will be described below. A hollow glass fiber 12' which will serve as the cladding 12 is first prepared. The hollow glass fiber 12' may be of, for instance, SF10 glass and has an outer diameter of about 100 μm and the hollow space therein has a diameter of about 1.0 μm. As shown in FIG. 5, PRA is kept as a molten solution 11' in a furnace, and one end portion of the glass fiber 12' is immersed in the molten solution 11'. Then, the molten PRA solution 11' enters the hollow space in the glass fiber 12' due to capillarity. The molten solution 11' is kept at a temperature slightly higher than the melting point (102° C.) of PRA in order to prevent the PRA from being decomposed. Thereafter, the glass fiber 12' is quenched to cause the PRA in the hollow space to be polycrystallized.

Then, the optical fiber 12' is gradually pulled from the furnace, which is kept at a temperature higher than the melting point of PRA (e.g., 102.5° C.) into an outer space which is kept at a temperature lower than that melting point, thereby causing the molten PRA to be monocrystallized continuously from the point where it is withdrawn from the furnace. The core 11 thus prepared is of a highly long monocrystalline form, 50 mm long or longer, and has a uniform crystal orientation. The optical wavelength converter device 10 is therefore sufficiently long. Since, as is well known in the art, the wavelength conversion efficiency of an optical wavelength converter device of this type is proportional to the length of the device, the longer the optical wavelength converter device, the greater the practical value of the device.

Figure 4:
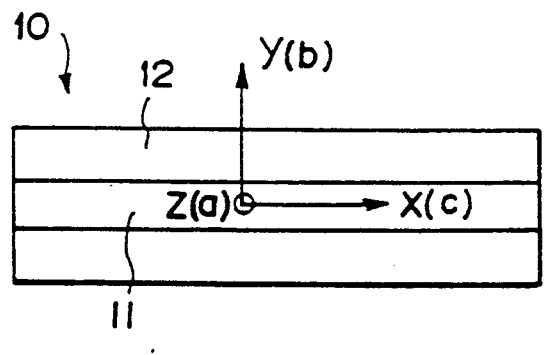
FIG. 4 is a schematic view showing the orientation of the crystal of the core of the optical wavelength converter device.

When PRA in the monocrystalline form is filled into the glass fiber 12' in the manner described above, the PRA crystal is oriented so that its c-axis (X-optic-axis) extends in the direction of the core axis as shown in FIG. 4.

After the core 11 is thus filled into the glass fiber 12', the glass fiber 12' is cut by a fiber cutter at opposite ends thereof, thereby obtaining an optical wavelength converter device 10 which is 5 mm long. The optical wavelength converter device 10 is combined with the light source system 20 as shown in FIG. 1, and thus an optical wavelength conversion module is formed. The light source system 20 has a semiconductor laser 21 for emitting the fundamental wave. A laser beam 15 (as the fundamental wave) emitted from the semiconductor laser 21 is collimated by a collimator 22, and then is passed through an anamorphic prism pair 23 and a λ/2 plate 25. The beam is then converted by a condenser lens 26 into a small beam spot which is applied to an entrance end 10a of the optical wavelength converter device 10. In this manner, the fundamental wave 15 enters the optical wavelength converter device 10. As described above, the PRA of the core 11 is of such a crystal orientation that the X-axis extends along the core axis. In this example, the λ/2 plate 25 of the light source system 20 is rotated to polarize the fundamental wave 15 in the direction of the Y-axis, and the Y-polarized fundamental wave 15 is applied to the optical wavelength converter device 10.

The fundamental wave 15 which has entered the optical wavelength converter device 10 is converted by the PRA of the core 11 into a second harmonic 15' whose wavelength is a half of the wavelength of the fundamental wave 15. The second harmonic 15' is radiated into the cladding 12 and travels toward an exit end 10b of the optical wavelength converter device 10 while it is totally reflected repeatedly at the outer surface of the cladding 12. Phase matching is achieved between a guided mode in which the fundamental wave 15 is guided through the core 11 and a radiated mode in which the second harmonic 15' is radiated into the cladding 12. (so-called Cerenkov-radiation).

A beam 15" which is a mixture of the second harmonic 15' and the fundamental wave 15 is emitted from the exit end 10b of the optical wavelength converter device 10. The emitted beam 15" is converged by a condenser lens 27 and then applied to a bandpass filter 28 which allows the second harmonic 15' to pass therethrough and absorbs the fundamental wave 15. Thus only the second harmonic 15' is extracted from the bandpass filter 28. Using a polarizer or the like, it was confirmed that the second harmonic 15' was Z-polarized light, and accordingly, that the nonlinear optical constant $d_{32}$ of the PRA was utilized.

The wavelength conversion efficiency will be described, hereinbelow. As the semiconductor laser 21, a GaAs-laser and an InGaAs-laser were used. The wavelength conversion efficiency were investigated with the oscillating wavelength being in the range of 760 to 1000 nm and the power of the fundamental wave 15 being 20 mW. The relation between the wavelength of the second harmonic and the wavelength conversion efficiency were as shown by curve 1 shown in FIG. 6. Curves 2 and 3 in FIG. 6 show the relation between the wavelength of the second harmonic and the wavelength conversion efficiency in the case of two different optical wavelength converter device, one being formed in the same manner as the optical wavelength converter device 10 of this embodiment except that the cladding is formed of SF1 glass and the other being formed in the same manner as the optical wavelength converter device 10 of this embodiment except that the cladding is formed of SF15 glass.

Figure 6:
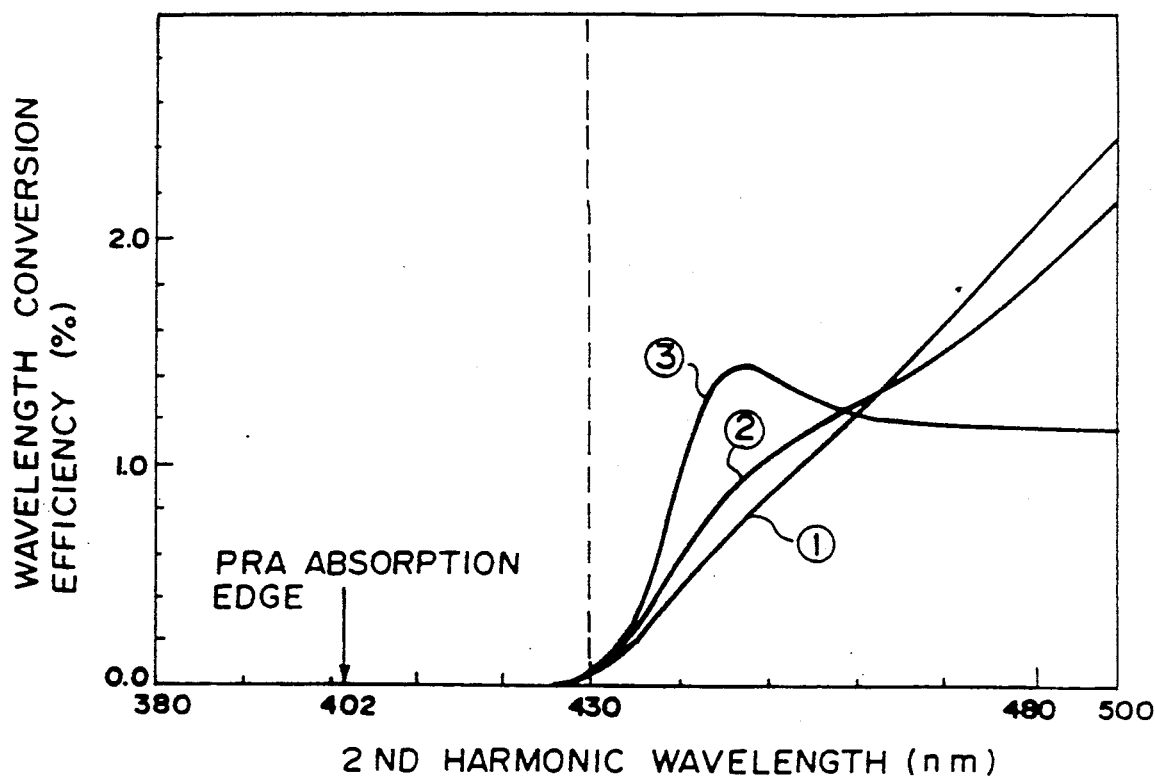
FIG. 6 is a graph showing the relation between the wavelength of the second harmonic and the wavelength conversion efficiency in accordance with an embodiment of the present invention.

As can be seen from FIG. 6, for the fundamental wave input of 20 mW, the optical wavelength converter device shown by the curve 1 exhibits a wavelength conversion efficiency of not lower than 1% at a wavelength of the second harmonic not shorter than 435 nm and the optical wavelength converter device shown by the curve 3 exhibits a wavelength conversion efficiency of not lower than 1% at a wavelength of the second harmonic not shorter than 440 nm. Accordingly, when a laser having a higher output is used, a practical blue laser of mW order can be obtained.

Further, as can be understood from FIG. 6, the second harmonic 15' whose wavelength is slightly longer than the absorption edge of the PRA (402 nm) cannot emanate from the optical wavelength converter device, and when the wavelength of the second harmonic 15' is longer than the absorption edge of the PRA by 30 nm, a high wavelength conversion efficiency can be obtained to a certain extent. Accordingly, when extracting the second harmonic 15' by the use of a core formed of the PRA, the fundamental wave applied to the optical wavelength converter device should have a wavelength longer than 864 nm, i.e., 864 nm=(402+30)/2.

Second Embodiment

In this embodiment, the core 11 of the optical wavelength converter device 10 was formed of a single crystal of an organic nonlinear optical material represented by the following formula, i.e., 3,5-dimethyl-1-(4-nitrophenyl)-1, 2, 4-triazole (will be referred to as "TRI", hereinbelow.)

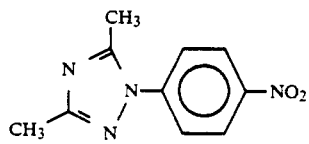

Claddings were formed of SF10 glass, SF1 glass and SF15 glass, and the TRI in the monocrystalline form was filled into the claddings in the manner described above in conjunction with the first embodiment.

Figure 7:
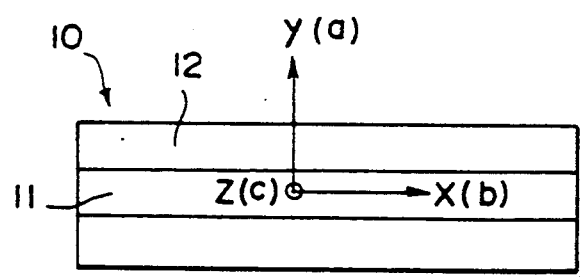
FIG. 7 is a schematic view showing the orientation of the crystal of the core of another optical wavelength converter device which can be employed in the present invention.

The TRI crystal was oriented so that its b-axis (X-optic-axis) extends in the direction of the core axis as shown in FIG. 7.

The three fiber-type optical wavelength converter devices thus prepared were of the same arrangement as those the wavelength conversion efficiency properties of which are respectively shown by the curves 1, 2 and 3 in FIG. 6.

Also in this case, the semiconductor laser 21, a GaAs-laser and an InGaAs-laser were used. The wavelength conversion efficiency were investigated with the oscillating wavelength being in the range of 760 to 1000 nm and the power of the fundamental wave 15 being 20 mW. When the Y-polarized fundamental wave 15 was applied to the optical wavelength converter devices, Z-polarized second harmonics 15' were obtained. Accordingly, also in this embodiment, the nonlinear optical constant $d_{32}$ of the PRA was utilized.

Figure 8:
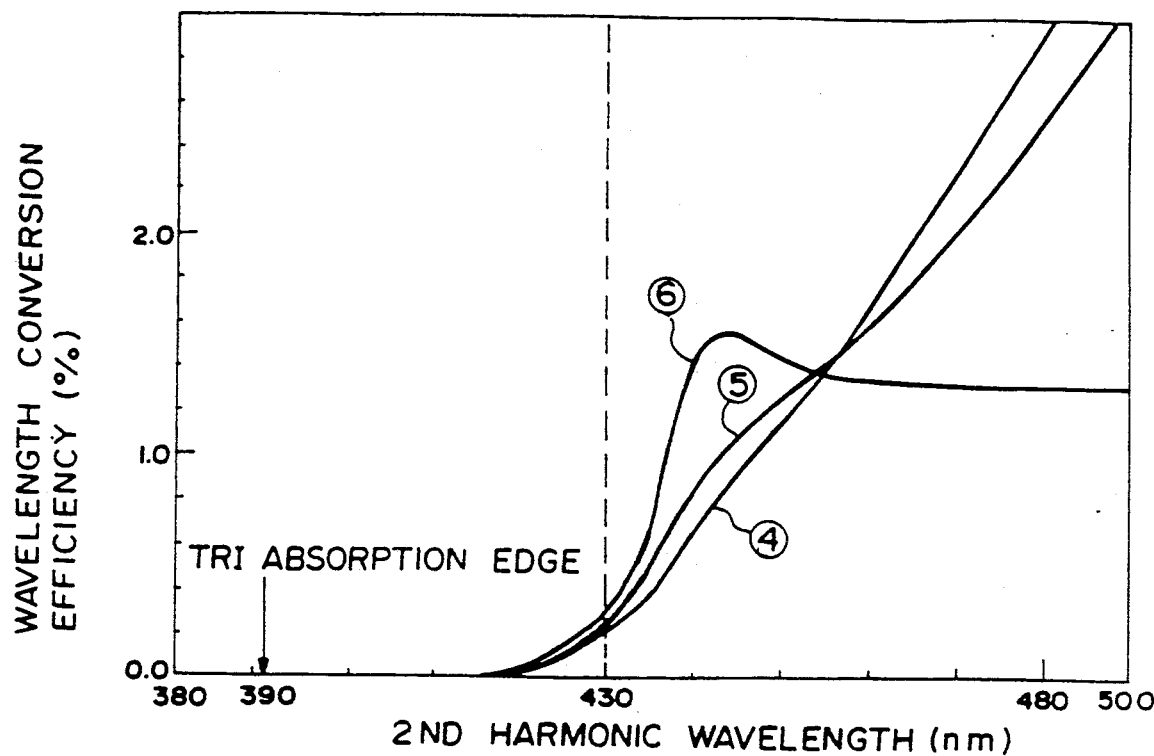
FIG. 8 is a graph showing the relation between the wavelength of the second harmonic and the wavelength conversion efficiency in accordance with another embodiment of the present invention.

The relation between the wavelength of the second harmonic and the wavelength conversion efficiency of the optical wavelength converter device having the cladding formed of SF10 glass is shown by curve 4 in FIG. 8, that of the optical wavelength converter device having the cladding formed of SF1 is shown by curve 5 and that of the optical wavelength converter device having the cladding formed of SF15 is shown by curve 6. As can be seen from FIG. 8, also in this embodiment, for the fundamental wave input of 20 mW, the optical wavelength converter devices shown by the curve 4 and 5 exhibit a wavelength conversion efficiency of not lower than 1.5% at a wavelength of the second harmonic not shorter than 455 nm and the optical wavelength converter device shown by the curve 6 exhibits a wavelength conversion efficiency of not lower than 1.5% at a wavelength of the second harmonic not shorter than 440 nm.

Further, also in this embodiment, when the wavelength of the second harmonic 15' is longer than the absorption edge of the TRI by 30 nm, a high wavelength conversion efficiency can be obtained to a certain extent. Accordingly, when extracting the second harmonic 15' by the use of a core formed of the TRI, the fundamental wave applied to the optical wavelength converter device should have a wavelength longer than 840 nm, i.e., 840 nm=(390+30)/2.

Control

A pair of fiber-type optical wavelength converter devices which were the same in structure as those described in the first embodiment except that the claddings were formed of SF7 glass and F7 glass were prepared. The wavelength conversion efficiency of the optical wavelength converter device having the cladding formed of SF7 glass is shown by curve 7 in FIG. 9, and that of the optical wavelength converter device having the cladding formed of F7 glass is shown by curve 8 in FIG. 9. The wavelength conversion efficiency was measured in the manner described above in conjunction with the first embodiment. In this case, the fundamental wave 15 was polarized in the direction of Z-axis and then applied to the optical wavelength converter devices. The second harmonics 15' obtained was polarized in the direction of Z-axis. Accordingly, in this case, the nonlinear optical constant $d_{33}$ was utilized.

Figure 9:
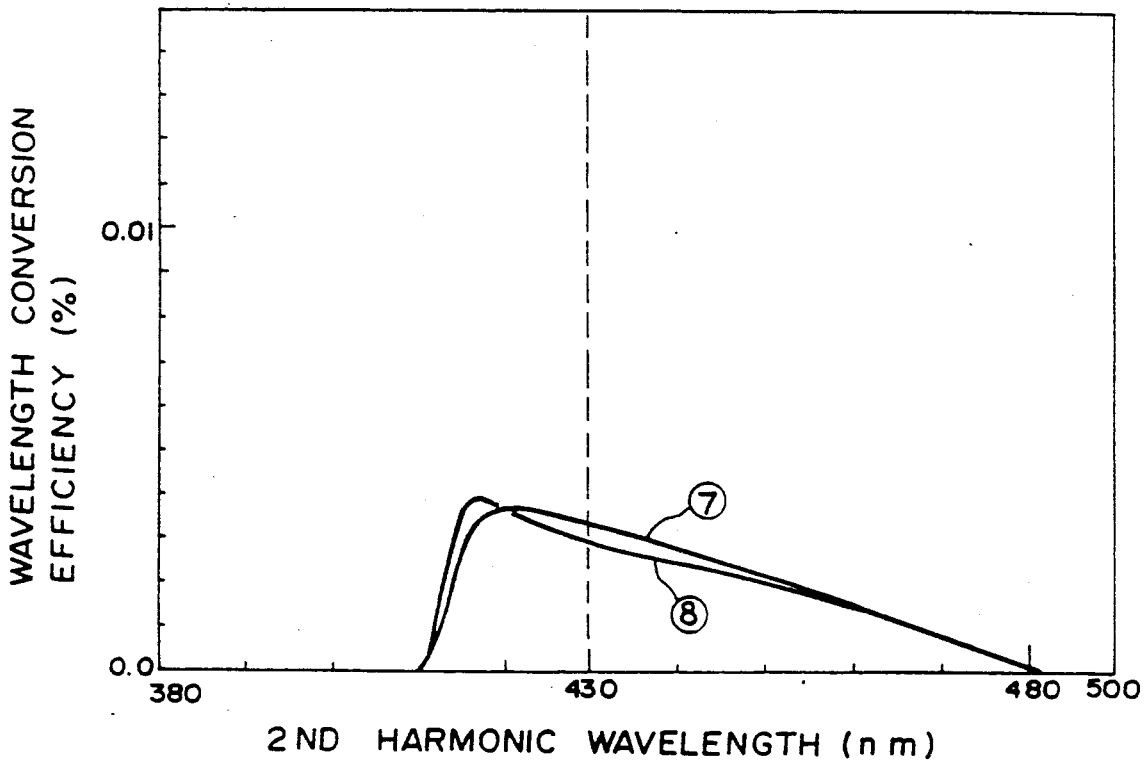
FIG. 9 is a graph showing the relation between the wavelength of the second harmonic and the wavelength conversion efficiency in accordance with the prior art.

As can be seen from FIG. 9, the wavelength conversion efficiency of the controls are at most 0.004%. Compared with the wavelength conversion efficiency of the optical wavelength converter device in the first embodiment, the latter is more than 100 times higher than the former. Conventionally, it has been thought that the wavelength conversion efficiency is proportional to the square of the nonlinear optical constant. However, when it is true, the latter can be 6 times as high as the former at most since the values of the nonlinear optical constants $d_{32}$ and $d_{33}$ of the PRA were as shown in the table described before. Accordingly, it can be thought that when the non-diagonal component $d_{32}$ is used, an especially high wavelength conversion efficiency can be obtained for some reason.

Though, in the embodiments described above, the present invention is applied in order to convert the fundamental wave into the second harmonic, the present invention can be applied in order to convert the fundamental waves into a wave which has a frequency equal to the difference between or the sum of the frequencies of the fundamental waves, or a third harmonic. Further the present invention can be applied also to a three-dimensional optical waveguide type optical wavelength converter device or a two-dimensional optical waveguide type optical wavelength converter device without being limited to the fiber-type optical wavelength converter device.

Figure 2:
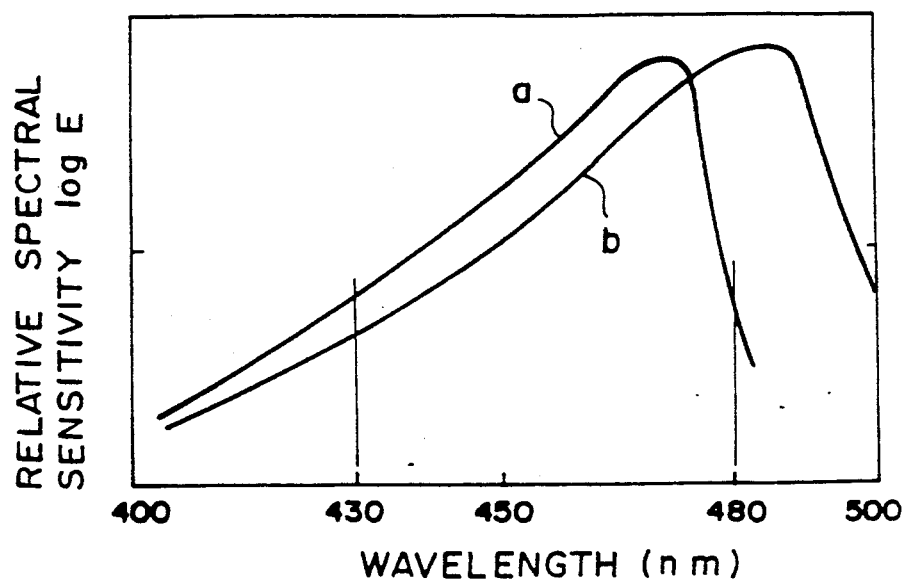
FIG. 2 is a graph showing a spectral sensitivity properties of silver halide photosensitive material.

Further the present invention can be applied to produce a recording light for relatively newly developed photosensitive material which is sensitive to light having a wavelength near 500 nm. For example, for the photosensitive material whose spectral sensitivity properties are shown by the curve b in FIG. 2, an InGaAs-laser is used as the fundamental wave source, and a laser beam which is emitted from the laser and has a wavelength of 980 nm is converted into the second harmonic having a wavelength of 490 nm in accordance with the method of the present invention. Then the second harmonic is used as the recording light.

What is claimed is:

1. An optical wavelength converting method in which a fundamental wave is caused to enter a Cerenkov-radiation type optical wavelength converter device comprising a single-crystal organic nonlinear optical material of an orthorhombic system of mm2 point group disposed in a cladding as a waveguide and a wavelength-converted wave such as a second harmonic whose wavelength is within the range of 430 to 500 nm is extracted, characterized in that the wavelength of said fundamental wave is selected so that the wavelength of the wavelength-converted wave becomes longer than the absorption edge of the organic nonlinear optical material by at least 30 nm, and the fundamental wave is linearly polarized in the direction of the x-optic-axis or the y-optic-axis of the crystal of the organic nonlinear optical material and then caused to enter the optical wavelength converter device, and a wavelength-converted wave which is linearly polarized in the z-optic-axis of the crystal is extracted.

2. An optical wavelength converting method as defined in claim 1 in which said single-crystal organic nonlinear optical material is 3,5-dimethyl-1-(4-nitrophenyl)pyrazole.

3. An optical wavelength converting method as defined in claim 1 in which said single-crystal organic nonlinear optical material is 3,5-dimethyl-1-(4-nitrophenyl)-1, 2, 4-triazole.

* * * * *